R. O. DE K. HALL & H. A. DUXBURY.
DEVICE FOR FASTENING OR SECURING ROPES, ROPE HANDLES, CORDS, AND THE LIKE.
APPLICATION FILED DEC. 17, 1915.
1,225,623.
Patented May 8, 1917.
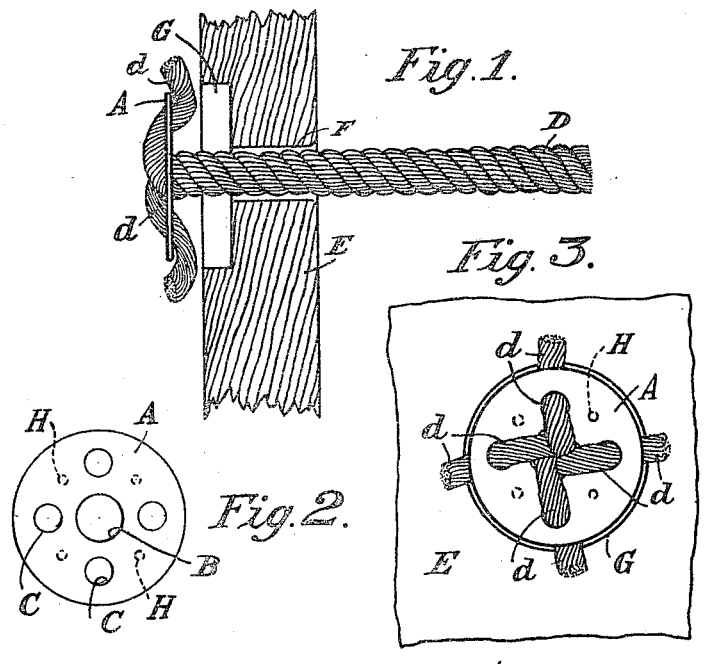
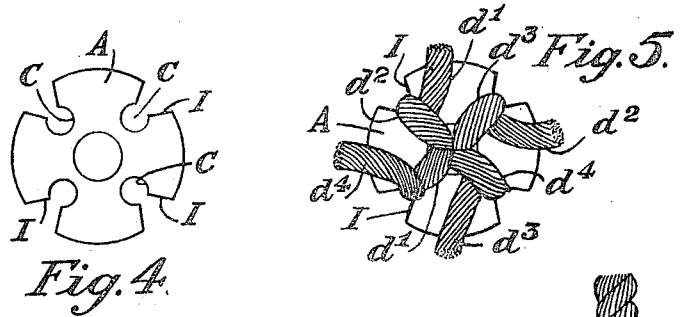
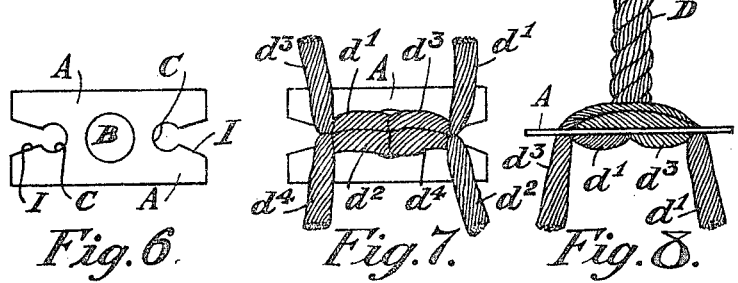

UNITED STATES PATENT OFFICE.

ROBERT OWEN DE KINGSLEY HALL AND HENRY ARTHUR DUXBURY, OF WIGAN, ENGLAND.

DEVICE FOR FASTENING OR SECURING ROPES, ROPE HANDLES, CORDS, AND THE LIKE.

1,225,623. Specification of Letters Patent. Patented May 8, 1917.

Application filed December 17, 1915. Serial No. 67,376.

*To all whom it may concern:*

Be it known that we, ROBERT OWEN DE KINGSLEY HALL and HENRY ARTHUR DUXBURY, subjects of the King of Great Britain, both residing at Wigan, in the county of Lancaster, in the Kingdom of England, have invented certain new and useful Improvements in Devices for Fastening or Securing Ropes, Rope Handles, Cords, and the like, of which the following is a specification.

This invention has for its object certain improvements in devices for fastening or securing ropes or rope handles to boxes and other objects, by the use of which ease and quickness of attachment is secured, and an economy in the rope is effected. Hitherto rope handles for boxes and other packages have been held or fastened by passing the ends of the rope through holes in the package, and then by making knots at the ends of the rope, the handle was prevented from becoming detached from the holes. These knots take some time to make, they are inconveniently bulky, they take a good deal of rope to make them, and are troublesome in other ways. By the present invention the use of knots is avoided altogether.

The invention is characterized by this, that the strands of the rope are collectively passed through a hole in the box or other object to which the rope is to be fastened, and through a hole in a washer or plate, and the individual strands are then passed into separate holes in the said washer or plate in such a manner that it forms a binding cleat or grip for the rope by the kinks or bends in the strands. The free ends of the strands which are left projecting are gripped between the washer or plate and the box or other object when the rope is pulled tight, but this gripping of the projecting ends of the strands between the washer and box or other object is not relied on for fastening the rope, but is merely done in order to dispose of or house the free ends.

The invention will be understood from the following description, reference being had to the accompanying drawings, in which:—

Figure 1 is a sectional view showing one end of a rope handle secured to a box lid, Figs. 2, 4 and 6, are plan views of the washer or plate member which forms a cleat or clip for the end of a rope, Figs. 3, 5, and 7, are plan views showing the rope strands and the under side of the washer or plate member of Figs. 2, 4, and 6, in assembled position.

Fig. 8 is an edge view of Fig. 7.

Referring first to Figs. 1, 2, and 3, our invention comprises a washer or plate member A which is adapted to form a cleat or grip. This plate may be circular or any other suitable shape. It is provided with a center hole B, and in addition a number of holes C spaced around the center one, there being as many of these spaced holes as there are strands in the rope or cord D. In the case of a cord or rope handle, two holes are made in the box or box lid E for the passage of the cord or rope ends one of which holes is shown at F, and on the inside of the box or lid there is, in connection with each of these holes, a recess G deep enough to receive a washer or plate A, so that the latter will lie substantially flush on the inside of the box. The strands *d* of the rope at the two ends having been unraveled or separated, the said strands are passed collectively down through the holes F in the box and through the center hole B in the plates or washers A, and then the individual strands are passed up through a separate hole C in the plates, so that the said plates or washers form binding cleats or grips for the rope by the kinks or bends in the strands. The free ends of the strands are left projecting between the plate A and the base of the recess G. When tension is applied to the handle, the plates or washers A obtain such a firm grip on the ends of the rope that the latter cannot become separated therefrom, and the plates A form abutments which prevent the rope handle becoming separated from the box. In fact the greater the pull on the rope handle the greater will be the grip on the ends thereof. The loose ends of the strands cannot accidentally work out of the cleat, but it is quite easy to separate the rope from the grip or cleat if desired, in order to shorten the handle or remove it for renewal. The invention has been designed especially for ammunition boxes, fish boxes and other boxes, where rope handles are required.

To facilitate the strands being threaded through the holes C, the material of the plate A at one side of the holes may be cut away so as to allow the strands to be passed laterally into the holes, instead of having to be threaded through them. This is shown in Fig. 4, in which I is the cut-away part at the side of each hole. The strands D are passed collectively down through the center hole B, and then one individual strand $d^1$ Fig. 5 is passed upward into a hole C through the cut away part I and down through the next succeeding hole C thus firmly gripping the strand. The next individual strand $d^2$ is passed upward into a hole C on top of the strand $d^1$ (thus further locking the strand $d^1$) and down through the next succeeding hole C in the plate A thus locking the said strand $d^2$. The same operation is repeated with the strand $d^3$, and as regards the strand $d^4$, this is passed upward through a hole C on top of the strand $d^3$ (thus further locking the strand $d^3$) and down through the next succeeding hole C thus locking the strand $d^4$ and further locking the strand $d^1$. In this way the said plates A form binding cleats for the rope by the kinks or bends in the strands, and furthermore a double grip on each strand is secured by the respective strands being further locked by the succeeding strands, except the last one $d^4$ the end of which may be tucked in under any of the previously formed loops.

A plate member made oblong instead of circular is shown in Fig. 6. In this A is the plate, B the center hole, C the holes spaced therefrom, the material of the plate at one side of the holes being cut away at I to allow the strands to be passed laterally into the holes. The strands D are passed collectively down through the center hole B, and then two individual strands $d^1$ $d^2$ are passed laterally through the cut away part I into one hole C, and the two individual strands $d^3$ $d^4$ passed into the other hole C as shown in Figs. 7 and 8 thus clenching them. The free ends of the strands $d^1$ $d^2$ which project from the top side of the plate A, are now passed along the top side of the plate one on each side of the rope D and down through the hole C into which have been passed the strands $d^3$ $d^4$ thus further locking the said strands, while the strands $d^3$ $d^4$ are passed along the top side of the plate A and into the hole C into which have been passed the strands $d^1$ $d^2$.

Among the advantages secured by the use of this invention are ease and quickness of attachment, the cleat does not project into the box, the material of the box is not so liable to split, less rope is used, and (there being no knot used) the danger of the knot slipping is avoided. The plates can be fastened in position to the inside of the box if desired by tacks or screws passed through holes H therein, and driven into the wood. The recesses G can be omitted, if there is no objection to the plate projecting into the box.

Although we have described this invention more particularly as applied to rope handles for boxes, yet it must be understood that it can be applied equally well to other purposes, such as to holders for the cords of window blinds, or in connection with the leading in wires of electric lamp holders, wall plugs and ceiling roses, or in connection with ropes or cords the length of which requires to be adjusted, and in fact to cord and rope holders generally.

We declare that what we claim is:—

1. In a device for fastening or securing ropes, rope handles, cords or the like, a washer or plate member having a hole through which the strands of the rope are collectively passed, and in addition a plurality of open ended slots terminating in round holes at the inner ends into which the individual strands of the rope after having been passed through the center hole are passed laterally.

2. Means for fastening or securing ropes, rope handles, cords or the like, comprising a washer or plate member having a central opening through which the strands of the rope are collectively passed, and supplementary openings in the said washer or plate through which the individual strands are passed in succession backwardly and forwardly whereby they may be clenched by the openings, and are locked by the succeeding strands which may be clenched on the top of them.

In witness whereof, we have hereunto signed our names this 30th day of November, 1915, in the presence of two subscribing witnesses.

ROBERT OWEN DE KINGSLEY HALL.
HENRY ARTHUR DUXBURY.

Witnesses:
G. C. DYMOND,
JOHN McLACHLAN.